May 19, 1970     A. BELZNER     3,512,907

ROTARY COMBUSTION ENGINE

Filed April 25, 1968

INVENTOR.
ADOLF BELZNER
BY Raymond P. Wallace
AGENT

United States Patent Office 3,512,907
Patented May 19, 1970

3,512,907
ROTARY COMBUSTION ENGINE
Adolf Belzner, Heilbronn-Neckargartach, Germany, assignor to NSU Motorenwerke Aktiengesellschaft Neckarsulm, and Wankel G.m.b.H., Lindau. (Bodensee), Germany
Filed Apr. 25, 1968, Ser. No. 724,199
Int. Cl. F02b 53/12
U.S. Cl. 418—113      1 Claim

ABSTRACT OF THE DISCLOSURE

In an internal combustion engine of the trochoidal type, there is no cooling of the ignition zone by intake of fresh gas, nor is there alternate firing at other locations, as in a reciprocating engine. Therefore, the edge of the spark aperture in the housing is subject to erosion and cracking. This condition is corrected by providing an insert containing the spark aperture, formed of material of high heat conductivity and good heat resistance, and less erosible than housing materials.

BACKGROUND OF THE INVENTION

This invention relates to rotary combustion engines of the trochoidal type, in which a multi-apexed rotor is mounted for relative rotation within a housing having a basically epitrochoidal profile to form working chambers which vary in volume on such relative rotation and perform the phases of intake, compression, combustion and expansion, and exhaust. Engines of this type are described in U.S. Pat. No. 2,988,065.

In this type of engine firing always takes place at the same location, and there is no cooling of the ignition zone by intake of fresh gas. Neither is there alternate firing at other locations as in the conventional reciprocating engine, and the ignition rate of trochoidal engines is usually much higher. Also, the spark plug cannot enter the firing chamber, but is installed in either the peripheral or end wall, with a small aperture to the firing chamber to carry the flame. The inner surface of the housing around the orifice of the ignition channel has a tendency to flake and crack, probably due to overheating in this region, and to the fact that for manufacturing reasons it is difficult to position passages for a cooling medium close to the aperture of the ignition channel.

It is therefore an object of this invention to provide a rotary engine in which cracks and flaking in the region of the ignition channel are eliminated.

It is a further object of the invention to provide a housing insert bearing the ignition channel and formed of heat resistant material of high conductivity.

Another object is to provide such a housing insert which will conduct heat from the ignition channel to the vicinity of a coolant passage.

A still further object is to provide an engine in which the inner surface of the housing has a facing layer, the edge of which in the vicinity of the ignition channel is protected from exposure to the firing zone.

SUMMARY OF THE INVENTION

The housing walls of trochoidal engines are commonly made of cast iron, steel, aluminum, or light metal alloy, none of which has a particularly high thermal conductivity. One or more spark plugs are normally installed in a threaded cavity in a wall of the housing, with a small bored hole to the inner surface of the housing to carry the flame from the spark plug cavity to the firing chamber. In accordance with the invention this small aperture may be lined with copper or other material of high thermal conductivity to carry away the heat, or an insert of such high conductivity material may be provided for the inner end of the cavity which communicates with the inner surface of the housing. Such an insert has an aperture therethrough for the ignition channel, and has the advantage of presenting a larger surface of high conductivity material at the firing point to carry the heat closer to the region of an adjacent cooling passage.

Further, the inner surface of the housing of rotary engines is often provided with a wear-resistance facing, which may be of chromium, ceramic composition, a metal carbide, or other plating material. When such a facing has an ignition channel through it, as would normally be the case, the difference in thermal expansion coefficients of the housing and the facing may cause minute fissures to open at the interface of the two materials. Fluid residues of the combustion may be swept into such fissures by the action of the rotor sweeping the housing, so that spalling, cracking and flaking of the coating is accentuated. This condition may be relieved by providing an insert which covers the edge of the facing. The spark plug aperture is flared out conically at the inner surface of the housing, and the coating is continued into the funnel-shaped portion. The insert has a male conical base at its inner end, so that when inserted into the aperture the edge of the facing is covered by the matching flare of the insert.

BRIEF DESCRIPTION OF THE DRAWING

The invention will be better understood on reading the following specification in conjunction with the accompanying drawing, in which—

DESCRIPTION OF THE PREFERRED EMBODIMENTS

Figure 1:
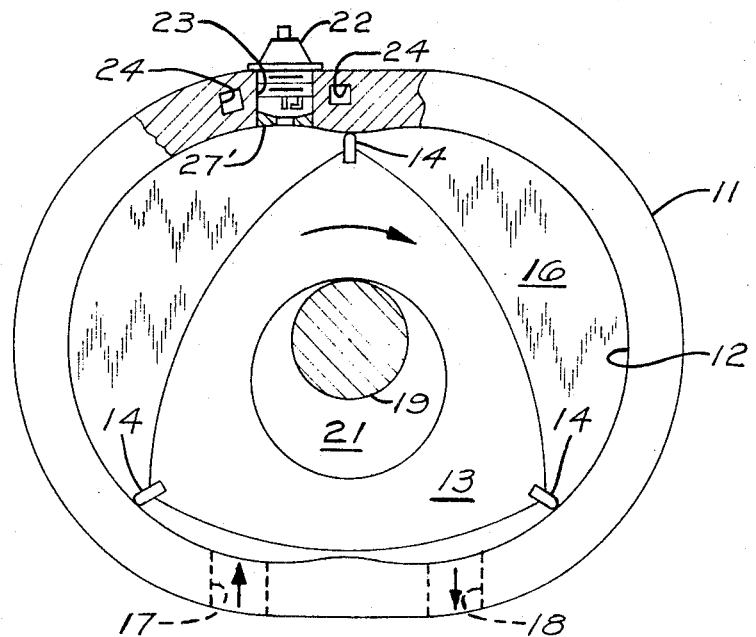
FIG. 1 is an elevation of a trochoidal engine with one end wall removed, showing one embodiment of the invention.

In FIG. 1 there is shown a general view of a trochoidal engine, having a peripheral housing 11 with a basically epitrochoidal inner surface 12 of two lobes, and a generally triangular rotor 13. Each of the rotor apexes is provided with an apex seal 14 sweeping the inner surface of the peripheral housing in sealing relation. The housing is closed by a pair of end walls, of which only the rear end wall 16 is shown, the front end wall being removed. The peripheral housing is provided with an inlet port 17 and an outlet port 18, although such ports may also be provided in one or both end walls. A shaft 19 transpierces the end walls on the longitudinal axis of the housing cavity, and has an eccentric portion 21 disposed within the cavity on which the rotor is mounted.

A spark plug 22 is shown installed in a threaded aperture 23 in the peripheral wall, although such spark plug apertures may equally well be provided in either of the end walls, and there may be more than one spark plug. Positioned at the inner end of aperture 23 is an insert 27', shown in more detail in FIG. 3. The engine housing is provided with passages 24 for a cooling medium, two such passages being shown in the vicinity of the spark plug.

Figures 2, 3:
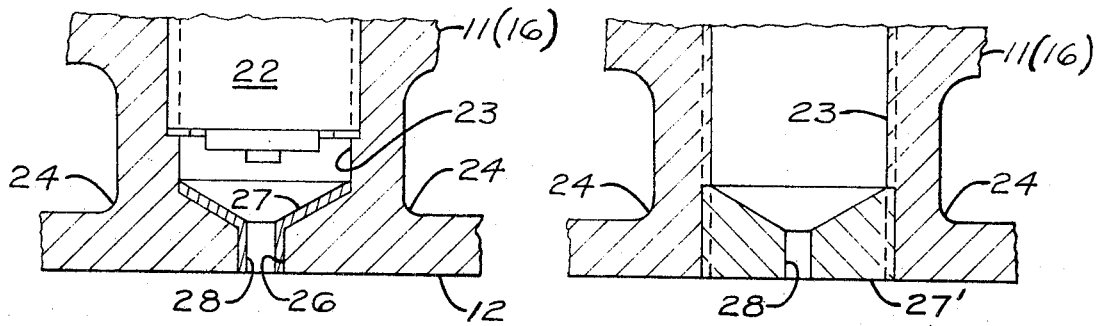
FIG. 2 is an enlarged fragmentary cross-section showing an embodiment of the invention.
FIG. 3 is a similar view showing another embodiment.

FIG. 2 shows a fragmentary portion of the housing in the spark plug region, which may be either the peripheral wall 11 or one of the end walls 16, containing a cavity 23 for the spark plug 22. The cavity is threaded sufficiently deeply to hold the spark plug, the bottom of the cavity being generally funnel-shaped and having a small bore 26 extending to the inner surface 12 of the housing. Installed in the bottom of the spark plug cavity is a generally funnel-shaped sleeve or insert 27, having a portion extending through the bore 26, the extension containing the ignition channel 28 which communicates with the spark plug cavity. Insert 27 may be made of copper or one of its alloys, or of silver or a silver alloy, or other suitable material having good heat resistance, about the same thermal expansion as the material of the housing, and a higher coefficient of thermal conductivity. The housing portion 11 or 16 is normally made of cast iron, steel, aluminum or an alloy thereof, all of which have relatively low thermal conductivity. In the case of a housing made of an aluminum alloy, copper has proved to be a material well suited for the insert.

Insert 27 is made to a close fit with the cavity in which it is then pressed into place, and to obtain good heat transfer to the housing wall it is advantageous to expand it by the introduction of an expanding tool into the ignition channel. The extension carrying the ignition channel 28 is finished flush with the inner surface of the housing, and the insert may be peened or pinned in place so that it will not turn.

In the embodiment shown in FIG. 2, heat from the passage of burning gases through the ignition channel is carried rapidly away from the orifice into the infundibular portion of the insert, which transfers it to the housing material at a point much closer to the coolant channels 24 than the actual orifice of the ignition channel.

In the embodiment of FIG. 3 the spark plug cavity 23 is shown threaded entirely through the housing wall, and has an insert 27' threaded into the inner orifice of the cavity flush with the housing wall. Insert 27' as shown has the same pitch diameter as the thread of the cavity so that its inward end is of the same diameter, which brings the outer circumferential surface of the insert closer to the coolant channels 24 for the purpose of heat transfer, although the ignition channel 28 is no larger than in the previous embodiment. Threading the cavity through to the inner surface simplifies manufacture and reduces its cost. However, the inner end of the cavity may be smooth-bored and have a smooth surfaced insert installed. In either case, whether the insert is threaded or smooth, it may be made with an interference fit and shrink-fitted into place for good heat transfer between its outer surface and the housing wall, and it may also be peened or pinned to prevent rotation.

Figure 4:
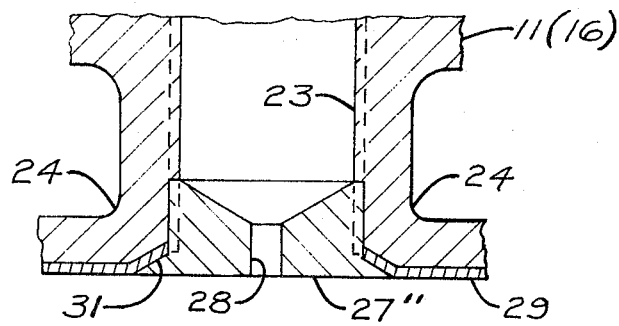
FIG. 4 is a similar view showing a third embodiment.

The embodiment of FIG. 4 is provided primarily for the case where it desired not to expose the edge of a housing coating to the combustion chamber. In this case the inner surface of the housing wall 11 or 16 is coated with one of the wear surfaces 29 previously described. The inner end of the spark plug cavity 23 is counterbored with a taper to produce a conical enlargement, and the wear coating 29 is continued into the funnel-shaped tapered surface. The cavity is threaded through the wall as far as the inner taper, and there is installed in the inner end of the cavity an insert 27" which has at its inner end an outwardly flared flange portion 31 having a male taper matching that of the coated portion of the cavity. This tapered base 31 of insert 27" covers the coating edge where it runs into the tapered portion of the cavity. Such an arrangement also brings the high conductivity material of the insert still closer to the coolant channels 24 and may be used for such a purpose even where the housing surface is not coated. The insert of this embodiment may be either threaded or smooth and may also be shrink-fitted into place. As with the other embodiments, an expanding tool may be inserted into the ignition channel 28 to secure additional closeness of contact, and the insert may again be pinned or peened against the possibility of rotation.

What is claimed is:

1. A rotary combustion engine with external ignition having a housing and a rotor mounted therein for relative rotation, the housing having a smooth inner surface swept by sealing elements carried by the rotor, the housing having in a wall thereof at least one spark plug cavity having an aperture communicating with the interior of the housing at the smooth inner surface thereof, wherein the improvement comprises: An insert having approximately the same diameter as the cavity and positioned therein with its inner end flush with the smooth housing surface and having an ignition channel therethrough providing communication between the cavity and the interior of the housing, the insert being formed of a material having higher heat conductivity than the material of the housing and having about the same thermal expansion, the spark plug cavity being conically enlarged at the inner surface of the housing and the insert having a mating conical base, the inner surface of the housing wall having a facing layer extending into the conical enlargement of the cavity and the conical base of the insert covering the edge of the layer, the insert conducting heat away from the spark plug aperture to prevent spalling of the housing surface in the region of the aperture.

References Cited

UNITED STATES PATENTS

| 1,813,781 | 7/1931 | Thomas. | |
|---|---|---|---|
| 2,075,911 | 4/1937 | Roth. | |
| 2,887,994 | 5/1959 | Morris | 123—41.69 |
| 3,058,452 | 10/1962 | Espenschied. | |
| 2,803,228 | 8/1957 | Sorensen | 123—32 |
| 3,249,095 | 5/1966 | Hamada | 123—855 |

FOREIGN PATENTS 1,334,873  7/1963  France.

MARK M. NEWMAN, Primary Examiner

A. D. HERRMANN, Assistant Examiner

U.S. Cl. X.R.

418—179